(12) United States Patent
Lee et al.

(10) Patent No.: US 9,152,280 B2
(45) Date of Patent: Oct. 6, 2015

(54) TOUCH DEVICE AND FABRICATION METHOD THEREOF

(75) Inventors: Yuh-Wen Lee, Zhubei (TW); Keming Ruan, Ningde (CN); Xianbin Xu, Xiamen (CN); Fengming Lin, Fuzhou (CN)

(73) Assignee: TPK Touch Solutions (Xiamen) Inc., Xiamen (CN)

(*) Notice: Subject to any disclaimer, the term of this patent is extended or adjusted under 35 U.S.C. 154(b) by 180 days.

(21) Appl. No.: 13/550,625

(22) Filed: Jul. 17, 2012

(65) Prior Publication Data

US 2013/0106739 A1    May 2, 2013

(30) Foreign Application Priority Data

Oct. 26, 2011    (CN) .......................... 2011 1 0335618

(51) Int. Cl.
*G06F 3/044* (2006.01)
(52) U.S. Cl.
CPC ...... *G06F 3/044* (2013.01); *G06F 2203/04103* (2013.01); *Y10T 29/49826* (2015.01)
(58) Field of Classification Search
None
See application file for complete search history.

(56) References Cited

U.S. PATENT DOCUMENTS

| 7,986,092 | B2 * | 7/2011 | Kim ............................... 313/504 |
| 2008/0074398 | A1 * | 3/2008 | Wright .......................... 345/173 |
| 2011/0180798 | A1 * | 7/2011 | Shim et al. ...................... 257/59 |
| 2011/0242020 | A1 * | 10/2011 | Kang et al. ..................... 345/173 |
| 2011/0279405 | A1 * | 11/2011 | Meng ............................ 345/174 |
| 2012/0274602 | A1 * | 11/2012 | Bita et al. ..................... 345/174 |

FOREIGN PATENT DOCUMENTS

CN    201820209 U    5/2011

* cited by examiner

*Primary Examiner* — Amr Awad
*Assistant Examiner* — Donna Lui
(74) *Attorney, Agent, or Firm* — Gokalp Bayramoglu

(57) ABSTRACT

The embodiments of the present disclosure provide a touch device having a sensing area and a peripheral area around the peripheral area. The touch device comprises a sensing electrode layer, a shading layer, and a signal transmission line, wherein the shading layer is disposed on the peripheral area and the sensing electrode layer. The shading layer has a hollow part and wholly overlays the peripheral area. The signal transmission line is disposed on the shading layer and filled in the hollow part. The signal transmission line is electrically connected to the sensing electrode layer through the shading layer beneath the hollow part. In addition, a fabrication method of the touch device is also provided.

19 Claims, 3 Drawing Sheets

TOUCH DEVICE AND FABRICATION METHOD THEREOF

BACKGROUND OF THE INVENTION

This Application claims the benefit of the People's Republic of China Application No. 201110335618.X, filed on Oct. 26, 2011.

FIELD OF THE INVENTION

The present disclosure relates to a touch technology. More particularly, the present disclosure relates to a touch device and a fabrication method thereof.

DESCRIPTION OF THE RELATED ART

In recent years, touch devices have been widely applied in a variety of electronic products such as mobile phones, personal digital assistants (PDA) or pocket personal computers (PC) and the like. Touch devices generally comprise a substrate and some internal components such as sensing electrode, black light blocking layer, and touch signal wire etc., wherein the substrate is provided with a protection function and a carrying function for those internal components, and wherein the substrate is formed with a sensing area and a peripheral area surrounding the sensing area. The sensing electrode is disposed on the sensing area and the peripheral area of the substrate, and a black light blocking layer is overlaid on the sensing electrode at the peripheral area. A through hole is then formed on the black light blocking layer and filled with a conductive adhesive, thereby electrically connecting the sensing electrode and the touch signal wire on the black light blocking layer.

However, there exists a problem of color difference between the conductive adhesive filled in the through hole and the black light blocking layer such that the through hole of the black light blocking layer makes the appearance of the traditional touch device bad.

SUMMARY OF THE INVENTION

In view of the foregoing problem existing in prior arts, an object of the present disclosure is to provide a touch device and a fabrication method thereof. A hollow part is disposed on a shading layer such that the shading layer beneath the hollow part has electrical connectivity and shading function. This overcomes the problem of bad appearance of the traditional touch device.

According to an embodiment of the present disclosure, a touch device comprises: a sensing electrode layer disposed on a sensing area and a peripheral area surrounding the sensing area; a shading layer overlaying the sensing electrode layer at the peripheral area and having a hollow part; a signal transmission line disposed on the shading layer and filled in the hollow part, wherein the signal transmission line is electrically connected to the sensing electrode layer through the shading layer beneath the hollow part.

According to another embodiment of the present disclosure, a fabrication method of a touch device having a sensing area and a peripheral area surrounding the sensing area comprises: forming a sensing electrode layer on the sensing area and the peripheral area; forming a shading layer on the sensing electrode layer at the peripheral area; forming a hollow part on the surface of the shading layer; and forming a signal transmission line on the shading layer, wherein the signal transmission line is filled in the hollow part, thereby electrically connecting the signal transmission line to the sensing electrode layer through the shading layer beneath the hollow part.

Impedance of shading layer of the present disclosure is changed by disposing the hollow part, namely by adjusting thickness of the shading layer so as to control the longitudinal conductivity. Thus, the signal transmission line and the sensing electrode layer can be electrically connected without forming a through hole on the shading layer. Compared with shading layer structure of the traditional touch device, shading layer of the embodiment of the present disclosure can avoid the problem of bad appearance of the touch device and increase yield of the touch device.

DETAILED DESCRIPTION OF THE EMBODIMENTS

Figure 1:
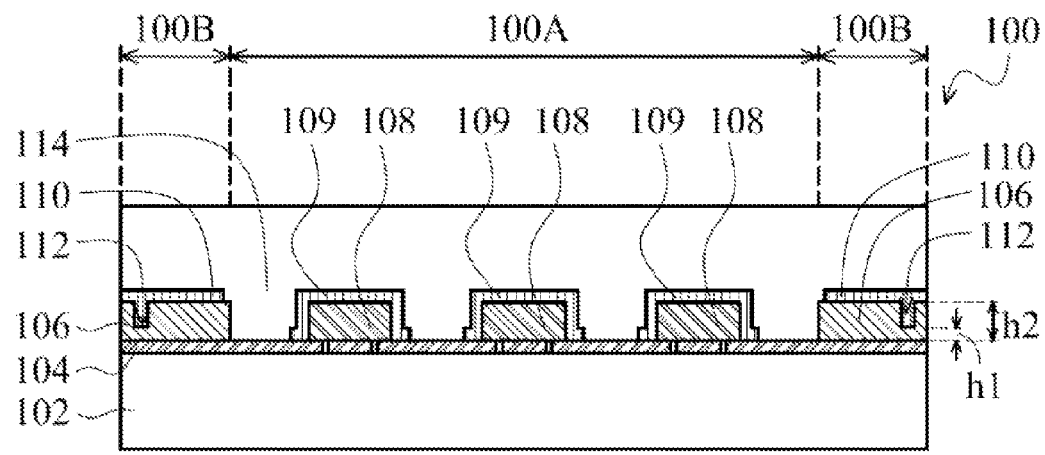
FIG. 1 is a section view diagram of a touch device in accordance with an embodiment of the present disclosure.

In order to make the foregoing objectives, features, and advantages of the present disclosure more comprehensive, several embodiments accompanied with drawings are described in detail below:

FIG. 1 shows a section view diagram of a touch device 100 in accordance with an embodiment of the present disclosure. The touch device 100 comprises a capacitive touch device having a sensing area 100A and a peripheral area 100B surrounding the sensing area 100A.

Touch components of the touch device 100 are disposed on a protective cover 102 (touch on lens), wherein external surface of the protective cover 102 is the touch surface of the touch device 100, and material of the protective cover can be a reinforced glass or any other applicable material. A sensing electrode layer 104 is disposed on the internal surface of the protective cover 102, and material of the sensing electrode layer 104 can be a transparent conductive material such as indium tin oxide (ITO), indium zinc oxide (IZO), and aluminum zinc oxide (AZO) or any other applicable transparent conductive material. The sensing electrode layer 104 is formed by a depositing process and a lithography and etching process.

Directions "on" and "beneath" referred in the following description are shown with respect to the directions of the protective cover 102 below, and those directions are used only for illustrating the corresponding position relationship of each component.

According to an embodiment of the present disclosure, a shading layer 106 is disposed on the sensing electrode layer 104 and located at the peripheral area 100B. Material of the shading layer 106 comprises black photo-resist or black printing ink. In order to transmit electrical changes induced by the sensing electrode layer 104 to a signal processor (not shown) of the touch device 100, a signal transmission line 110 is formed on the shading layer 106, wherein the signal transmission line 110 is required to be electrically connected to the sensing electrode layer 104. The signal processor of the touch device 100 can calculate touch signals and transmit the touch signals to a display device (not shown) such that the display device displays images on the basis of the touch signals.

According to an embodiment of the present disclosure, surface of the shading layer 106 is provided with a hollow part 112, wherein the hollow part 112 is not perforating the shading layer 106. The shading layer 106 completely overlays the peripheral area 100B. As there are no through holes on the shading layer 106, appearance of the touch device 100 is not affected.

In addition, thickness of the shading layer 106 can be adjusted by designing the hollow part 112. As shown in FIG. 1, a part of the shading layer 106 beneath the hollow part 112 has a first thickness h1, and a part of the shading layer 106 outside the area beneath the hollow part 112 has a second thickness h2. The first thickness h1 is less than the second thickness h2. Impedance of the shading layer 106 can be changed by adjusting thickness of the shading layer 106. Part of the shading layer 106 with thinner thickness has lower impedance, thereby having an electrical connecting effect. Part of the shading layer 106 with thicker thickness has greater impedance, thereby having an electrical insulating effect.

According to an embodiment of the present disclosure, thickness of the position on the shading layer 106 where the signal transmission line 110 is required to be electrically connected with the sensing electrode layer 104 is reduced to the first thickness h1 to form the hollow part 112, such that the shading layer 106 beneath the hollow part 112 has an electrical connecting effect in a longitudinal direction, wherein the longitudinal direction is perpendicular to surface direction of the shading layer 106. Simultaneously, the shading layer 106 with the first thickness h1 also has a light shading effect. In addition, part of the shading layer 106 outside the area beneath the hollow part 112 and with the second thickness h2 has an electrical insulating effect both in the longitudinal and transverse directions. Therefore, the shading layer 106 of the present disclosure can achieve the result of the area beneath the hollow part 112 having a longitudinal conducting effect and other areas having an insulating effect.

In the touch device 100, the signal transmission line 110 at the peripheral area 100B is disposed on the shading layer 106 and filled in the hollow part 112. The signal transmission line 110 can be electrical connected to the sensing electrode layer 104 through the shading layer 106 beneath the hollow part 112. Therefore, the electrical changes induced by the sensing electrode layer 104 are transmitted to an external integrated circuit (not shown) through the shading layer 106 beneath the hollow part 112 and the signal transmission line 110. The signal transmission line 110 is normally formed of metal wires, wherein impedance of the signal transmission line 110 is low enough to be omitted. Thus, longitudinal impedance of the shading layer 106 beneath the hollow part 112 is required to be less than the difference of the impedance allowed by the external integrated circuit minus the impedance of the sensing electrode layer 104.

In an embodiment, for example, if the impedance allowed by the external integrated circuit is less than 15 k$\Omega$, and the impedance of the sensing electrode layer 104 formed of indium tin oxide (ITO) is 8 k$\Omega$, longitudinal impedance of the shading layer 106 beneath the hollow part 112 must be less than 7 k$\Omega$. First thickness h1 of the shading layer 106 can be decided based on the material properties, required longitudinal impedance, and shading effect of the shading layer 106. In an embodiment, material of the shading layer 106 is a black photo-resist composed of solvent, high polymer, and black carbon paste, and longitudinal impedance required by the shading layer 106 is less than 7 k$\Omega$, such that the first thickness h1 of the shading layer 106 can be 0.6 $\mu$m, and the second thickness h2 of the shading layer 106 can be 1.8 $\mu$m.

Based on the thickness of the shading layer, impedance thereof is affected, wherein the thickness of the shading layer 106 is thinned to h1 when electrical connectivity is required, and the thickness of the shading layer 106 is thickened to h2 when electrical connection is not required such as in the position outside the area beneath the hollow part 112. Thus, the connection of the signal transmission line 110 and the sensing electrode layer 104 can be achieved, and the problem of bad appearance of the touch device 100 can be avoided, as holes are not required to be formed on the shading layer 106.

In addition, as shown in FIG. 1, an insulating part 108 at the sensing area 100A of the touch device 100 is disposed on the sensing electrode pattern of the sensing electrode layer 104, and a jump wire 109 is disposed on the insulating part 108. This makes any two adjacent sensing electrode patterns electrically connected without interconnection on a same row or a same column.

Furthermore, the touch device 100 further comprises a protective layer 114 wholly overlaid above the sensing electrode layer 104, the shading layer 106, the insulating part 108, the jump wire 109, and the signal transmission line 110.

FIG. 2A to 2E are section view diagrams of each phase of fabricating the touch device as FIG. 1 in accordance with an embodiment of the present disclosure, wherein a protective cover 102 is configured beneath the touch device 100.

Figure 2A:
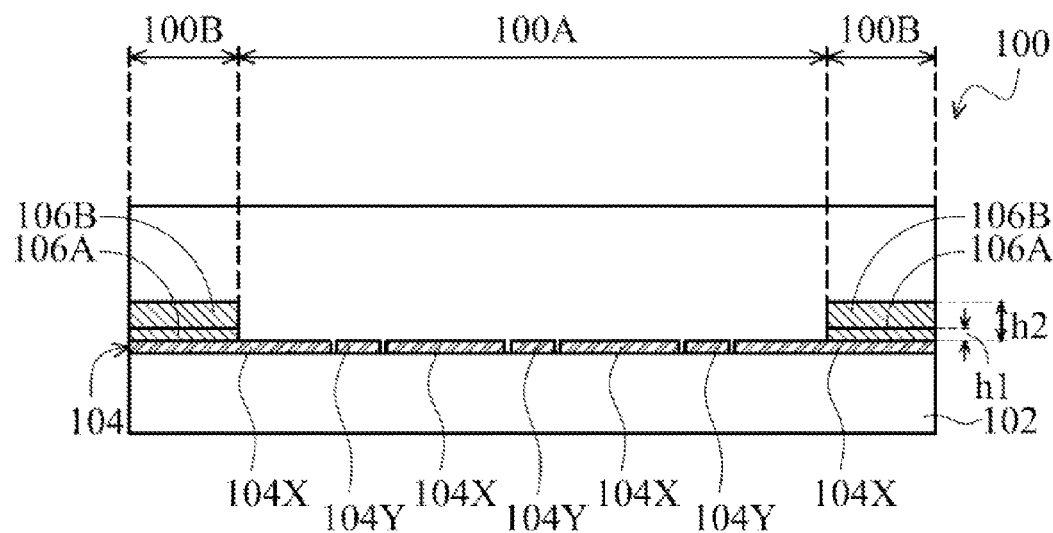
FIG. 2A to 2E are section view diagrams of each phase of fabrication of the touch device of FIG. 1 in accordance with an embodiment of the present disclosure.

Firstly, as shown in FIG. 2A, a protective cover 102 such as a reinforced glass is provided, and a transparent conductive material layer such as an indium tin oxide (ITO) layer is wholly deposited on the internal surface of the protective cover 102, wherein the depositing method is a sputtering process. Next, the transparent conductive material layer is patterned by a patterning process such as lithography and etching process, so as to form the sensing electrode layer 104. In an embodiment, the sensing electrode layer 104 comprises a plurality of rhombic sensing electrode patterns 104X which are aligned into columns, and a plurality of rhombic sensing electrode patterns 104Y which are aligned into rows. The sensing electrode patterns 104Y are connected to each other, and the sensing electrode patterns 104X are separated from each other. In other embodiments, the sensing electrode pattern of the sensing electrode layer 104 can also be of any other shape or any other aligning method.

Further, a first shading layer 106A is formed on the sensing electrode layer 104 at the peripheral area 100B. In an embodiment, thickness of the first shading layer 106A is h1. After that, a second shading layer 106B is formed on the first shading layer 106A. In an embodiment, total thickness of the first shading layer 106A and the second shading layer 106B is 112. Materials of the first shading layer 106A and the second shading layer 106B can both be same and can include black photo-resist or black printing ink or can both be of different materials. Black photo-resist can be patterned by the lithography process, whereas black printing ink can be patterned by the printing process, so as to form the first shading layer 106A and the second shading layer 106B.

Figure 2B:
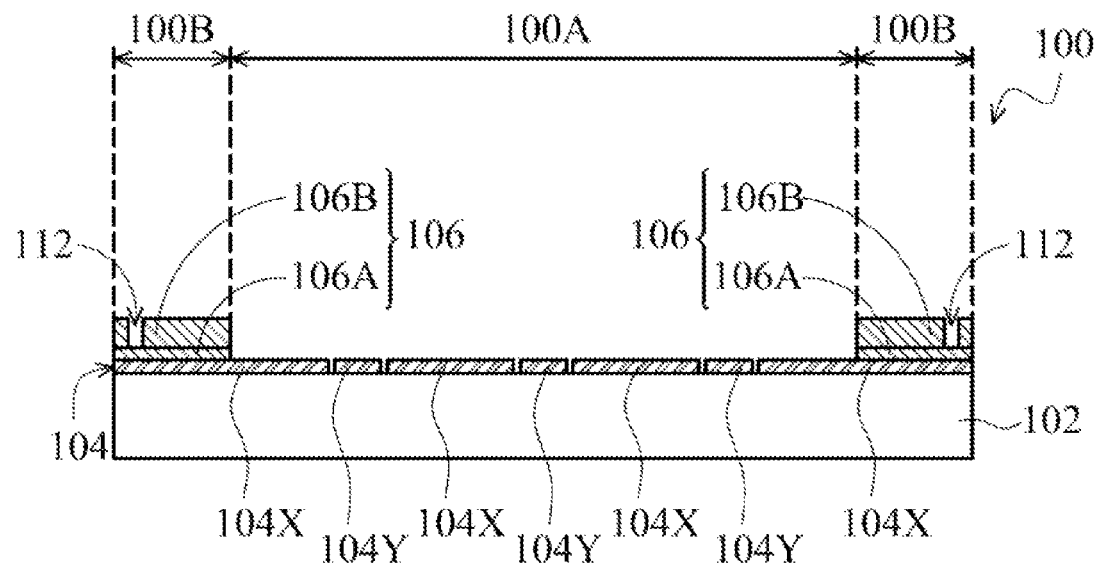

With reference to FIG. 2B, a hollow part 112 is formed on the second shading layer 106B. In an embodiment, the hollow part 112 is perforated in the second shading layer 106B to expose the first shading layer 106A. In another embodiment, the hollow part 112 does not perforate the second shading layer 106B as long as the total thickness of the first shading layer 106A and the second shading layer 106B beneath the hollow part 112 can achieve longitudinal impedance and shading effect required by the shading layer 106.

When material of the second shading layer 106B is a black photo-resist, the hollow part 112 is formed by a lithography process. When material of the second shading layer 106B is a black printing ink, the hollow part 112 is formed simultaneously during a printing process of forming pattern on the second shading layer 106B as FIG. 2A.

Figure 2C:
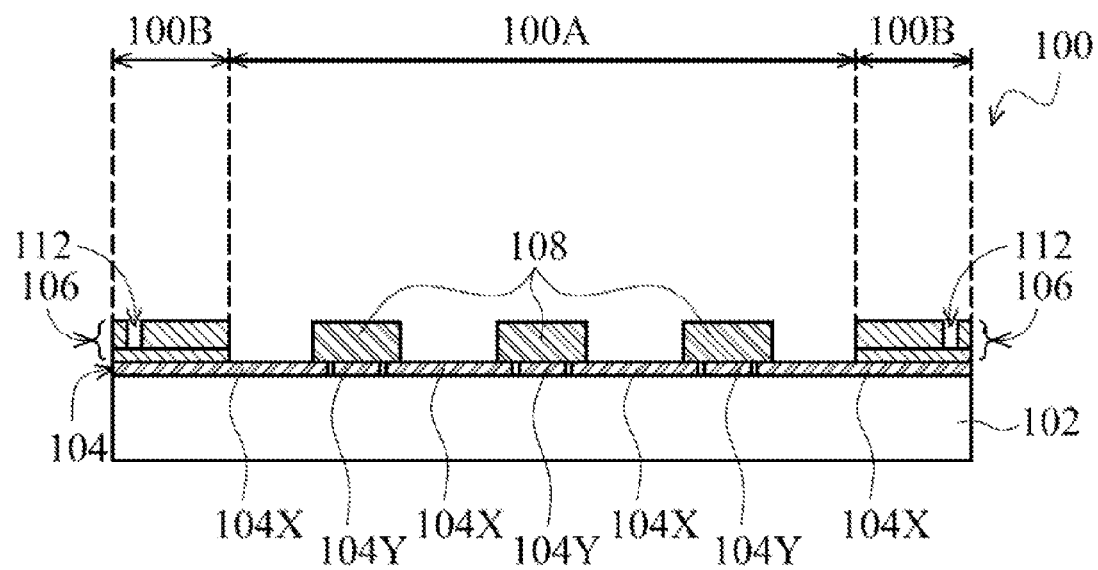

With reference to FIG. 2C, an insulating part 108 is formed on the sensing electrode pattern 104Y of the sensing electrode layer 104 to avoid short circuit happening to the jump wire 109 for electrically connecting any two adjacent sensing electrode patterns 104X in an same column and the sensing electrode patterns 104Y. Material of the insulating part 108 comprises organic or inorganic insulating material such as polyimide. The insulating material is patterned by a lithography and printing process to form the insulating part 108.

Figure 2D:
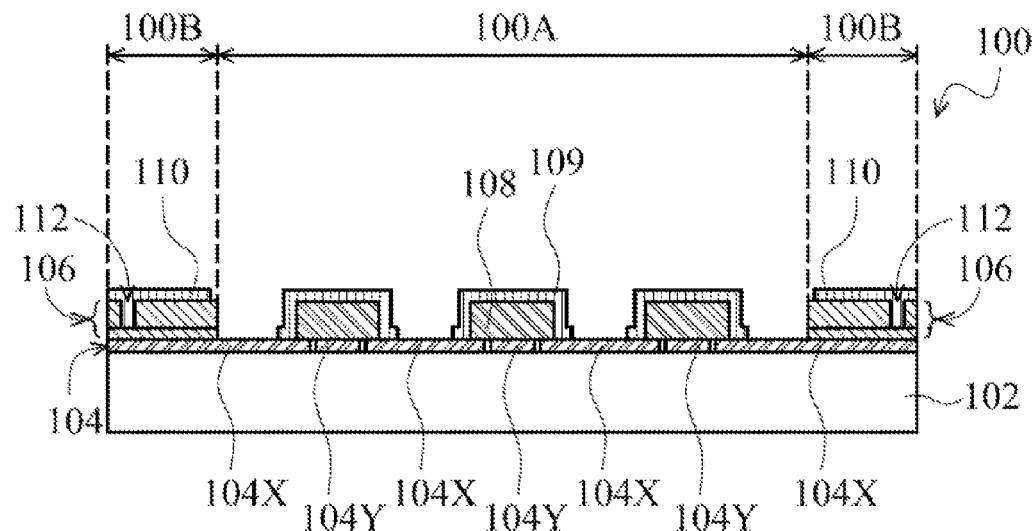

With reference to FIG. 2D, a signal transmission line 110 is formed on the second shading layer 106B and filled in the hollow part 112. In addition, a jump wire 109 is formed on the insulating part 108, wherein materials of the jump wire 109 and the signal transmission line 110 are metal materials. The metal material is patterned by a lithography and etching process or the printing process to form the jump wire 109 and the signal transmission line 110. In an embodiment, the jump wire 109 and the signal transmission line 110 are formed simultaneously by the same process.

Figure 2E:
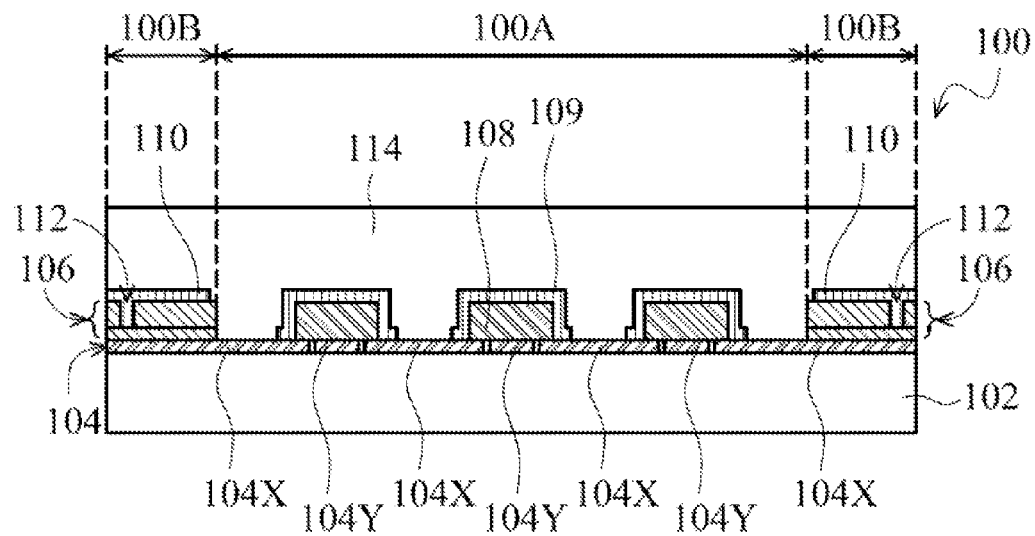

With reference to FIG. 2E, a protective layer 114 is wholly formed to overlay all components comprising a sensing electrode layer 104, an insulating layer 108, a jump wire 109, a shading layer 106 and a signal transmission line 110 etc. on the protective cover 102, thereby completing the fabrication of the touch device 100 as FIG. 1.

In conclusion, according to embodiments of the present disclosure, a hollow part 112 is formed on surface of the shading layer 106, so that thickness of the shading layer 106 beneath the hollow part 112 would be thinned and provided with a longitudinal conducting effect. The shading layer 106 is electrically connected to the sensing electrode patterns 104X through the signal transmission line 110. In addition, thickness of the part of the shading layer 106 outside the area beneath the hollow part 112 can achieve an effective insulating effect. Therefore, impedance of the shading layer 106 can be changed by adjusting thickness of the shading layer 106, such that the part of the shading layer 106 beneath the hollow part 112 has a longitudinal conducting effect, and other parts of the shading layer 106 outside the area beneath the hollow part 112 has both transverse and longitudinal non-conducting effects.

Since the shading layer 106 of embodiments of the present disclosure changes impedance by adjusting thickness to control longitudinal conductivity, perforated holes are not required to be formed on the shading layer 106, thereby electrically connecting the signal transmission line 110 and the sensing electrode layer 104. Compared with shading layer structure of the traditional touch device, the shading layer 106 of embodiments of the present disclosure can avoid the problem of bad appearance of the touch device 100.

Although the present disclosure refers to the above described embodiments, it is not intended to limit the scope of the present disclosure. It is apparent to those skilled in the art that modifications and substitutions to the described embodiments may be made without departing from the spirit and scope of the present disclosure. Accordingly, the scope of the present disclosure is further defined by the attached claims.

What is claimed is:

1. A touch device, comprising:
a sensing electrode layer disposed on a sensing area and a peripheral area, the peripheral area surrounding the sensing area;
a shading layer overlaying the sensing electrode layer at the peripheral area and having a hollow part; and
a signal transmission line disposed on the shading layer and fills the hollow part, wherein the signal transmission line is electrically connected to the sensing electrode layer through the shading layer beneath the hollow part;
wherein the shading layer located beneath the hollow part has a first thickness, and the shading layer located aside from the area that is beneath the hollow part has a second thickness, wherein the first thickness is less than the second thickness;
wherein the shading layer with the first thickness has electrical conductivity and the shading layer with the second thickness is electrically insulated.

2. The touch device of claim 1, wherein the material of the shading layer comprises a black photo-resist or a black printing ink.

3. The touch device of claim 1, further comprising:
a protective cover, wherein the sensing electrode layer is disposed on the protective cover and/or disposed between the protective cover and the shading layer; and
a protective layer wholly overlaid on the sensing electrode layer, the shading layer, and the signal transmission line.

4. A touch device, comprising:
a sensing electrode layer disposed on a sensing area and a peripheral area, the peripheral area surrounding the sensing area;
a shading layer overlaying the sensing electrode layer at the peripheral area and having a hollow part, wherein the shading layer comprises:
a first shading layer disposed on the sensing electrode layer and having an electrical conductivity; and
a second shading layer disposed on the first shading layer and having a hollow part; and
a signal transmission line disposed on the shading layer and fills the hollow part, wherein the signal transmission line is electrically connected to the sensing electrode layer through the shading layer beneath the hollow part.

5. The touch device of claim 4, wherein the hollow part perforates the second shading layer to expose the first shading layer.

6. The touch device of claim 5, wherein the first shading layer located beneath the hollow part has an electrical conductivity in a longitudinal direction such that the signal transmission line and the sensing electrode layer are electrically connected, and wherein the longitudinal direction is perpendicular to the surface of the sensing electrode layer.

7. The touch device of claim 4, wherein material of the first shading layer and the second shading layer is same.

8. The touch device of claim 4, wherein the material of the first shading layer and the second shading layer is different.

9. The touch device of claim 4, further comprising:
a protective cover, wherein the sensing electrode layer is disposed on the protective cover and/or disposed between the protective cover and the shading layer; and
a protective layer wholly overlaid on the sensing electrode layer, the shading layer, and the signal transmission line.

10. A fabrication method of the touch device, comprising:
forming a sensing electrode layer on a sensing area and a peripheral area, the peripheral area surrounding the sensing area;
forming a shading layer having a hollow part on the sensing electrode layer at the peripheral area, wherein the step of forming a shading layer further comprising:
forming a first shading layer on the sensing electrode layer; and
forming a second shading layer on the first shading layer, wherein the hollow part is formed on the second shading layer; and forming a signal transmission line on the shading layer, wherein the signal transmission line is filled in the hollow part, so that the signal transmission line is electrically connected to the sensing electrode layer through the shading layer beneath the hollow part.

11. The fabrication method of the touch device of claim 10, wherein the material of the shading layer comprises a black photo-resist or a black printing ink.

12. The fabrication method of the touch device of claim 10, wherein the hollow part is formed on surface of the shading layer.

13. The fabrication method of the touch device of claim 10, wherein a material of the first shading layer and the second shading layer is same.

14. The fabrication method of the touch device of claim 10, wherein a material of the first shading layer and the second shading layer is different.

15. The fabrication method of the touch device of claim 10, wherein a material of the second shading layer comprises a black photo-resist, and a step of forming the hollow part comprises a lithography process.

16. The fabrication method of the touch device of claim 10, wherein a material of the second shading layer comprises a black printing ink, and a step of forming the hollow part comprises a printing process.

17. The fabrication method of the touch device of claim 10, wherein the shading layer located beneath the hollow part has a first thickness and the shading layer with the first thickness has an electric conductivity in a longitudinal direction such that the signal transmission line and the sensing electrode layer are electrically conducted, and wherein the longitudinal direction is perpendicular to the surface of the sensing electrode layer.

18. The fabrication method of the touch device of claim 17, wherein the shading layer located aside from the area that is beneath the hollow part has a second thickness that is greater than the first thickness, and wherein the shading layer with the second thickness is electrically insulated.

19. The fabrication method of the touch device of claim 10, further comprising:

provifing a protective cover, wherein the sensing electrode layer is disposed on the protective cover and/or between the protective cover and the shading layer; and forming a protective layer to overlay the sensing electrode layer, the shading layer, and the signal transmission line.

\* \* \* \* \*